(12) United States Patent
Payne

(10) Patent No.: US 9,216,633 B2
(45) Date of Patent: Dec. 22, 2015

(54) CLOSE-OUT SEAL

(71) Applicant: GM GLOBAL TECHNOLOGY OPERATIONS LLC, Detroit, MI (US)

(72) Inventor: Roland A. Payne, Riley Center, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 12 days.

(21) Appl. No.: 14/153,459

(22) Filed: Jan. 13, 2014

(65) Prior Publication Data

US 2015/0197143 A1 Jul. 16, 2015

(51) Int. Cl.
*B60J 10/00* (2006.01)
*B60J 1/00* (2006.01)
*B60J 10/02* (2006.01)
*B62D 25/12* (2006.01)

(52) U.S. Cl.
CPC .............. *B60J 10/0048* (2013.01); *B60J 1/003* (2013.01); *B60J 10/0045* (2013.01); *B60J 10/02* (2013.01); *B62D 25/12* (2013.01)

(58) Field of Classification Search
CPC ........ B60J 10/02; B60J 10/06; B60J 10/0091; B60J 10/0045; B60J 10/0088; B60J 10/0054; B60J 10/0048; B60J 10/0014; B60J 10/0002; B60J 10/00; B60J 10/0094; B60R 13/06
USPC ........... 296/146.15, 93, 96.11, 96.21, 76, 201
See application file for complete search history.

(56) References Cited

U.S. PATENT DOCUMENTS

| | | | | |
|---|---|---|---|---|
| 4,351,559 | A * | 9/1982 | Sugisawa | 296/24.44 |
| 4,413,854 | A * | 11/1983 | Hirshberg | 296/146.8 |
| 4,587,760 | A * | 5/1986 | Brissette | 49/252 |
| 4,912,895 | A * | 4/1990 | Harris, Jr. | 52/208 |
| 5,112,101 | A * | 5/1992 | Katcherian et al. | 296/201 |
| 5,195,796 | A * | 3/1993 | Wampler, II | 296/76 |
| 5,297,843 | A * | 3/1994 | Yada et al. | 296/146.15 |
| 5,348,364 | A * | 9/1994 | Yada | 296/93 |
| 5,489,135 | A * | 2/1996 | Lipinski | 296/96.21 |
| 5,519,979 | A * | 5/1996 | Kunert et al. | 52/745.15 |
| 5,935,356 | A * | 8/1999 | Soldner | 156/71 |
| 6,287,402 | B2 * | 9/2001 | Soldner | 156/71 |
| RE37,395 | E * | 10/2001 | Kunert et al. | 52/745.15 |
| 7,188,885 | B2 * | 3/2007 | Schlater et al. | 296/96.21 |
| 8,695,292 | B2 * | 4/2014 | Recker | 52/208 |
| 2003/0006623 | A1 * | 1/2003 | Cornils et al. | 296/93 |

FOREIGN PATENT DOCUMENTS

| | | | | |
|---|---|---|---|---|
| JP | 1182120 | * | 7/1989 | 296/76 |
| JP | 2009012722 | * | 1/2009 | B60J 10/10 |

* cited by examiner

*Primary Examiner* — Gregory Blankenship
(74) *Attorney, Agent, or Firm* — Quinn Law Group, PLLC

(57) ABSTRACT

A vehicle includes a rear window having an outside surface, an inside surface, and a lower edge that connects the outside surface and the inside surface. The vehicle also includes a rear decklid that is selectively movable with respect to the rear window between an open position and a closed position. The rear decklid and the rear window define a gap therebetween. The vehicle further includes a close-out seal that is operatively connected to the inside surface of the rear window and that contacts the rear decklid when the decklid is in the closed position. The close-out seal is configured such that the lower edge and outside surface of the rear window are unobstructed and uncontacted by the close-out seal.

20 Claims, 1 Drawing Sheet

CLOSE-OUT SEAL

TECHNICAL FIELD

This disclosure relates to vehicle close-out seals.

BACKGROUND

Vehicles typically include a body having components, such as body panels, windows, and closures, that form the exterior surface of the vehicle. Close-out seals may be employed between two of the components to cover the gap that is formed between the components.

SUMMARY

A vehicle includes a rear window having an outside surface, an inside surface, and a lower edge that connects the outside surface and the inside surface. The vehicle also includes a rear decklid that is selectively movable with respect to the rear window between an open position and a closed position. The rear decklid and the rear window define a gap therebetween. The vehicle further includes a close-out seal that is operatively connected to the inside surface of the rear window and that contacts the rear decklid when the decklid is in the closed position. The close-out seal is configured such that the lower edge and outside surface of the rear window are unobstructed and uncontacted by the close-out seal.

A corresponding close-out seal is provided.

The above features and advantages and other features and advantages of the present disclosure are readily apparent from the following detailed description of the best modes for carrying out the disclosure when taken in connection with the accompanying drawings.

DETAILED DESCRIPTION

Figure 1:
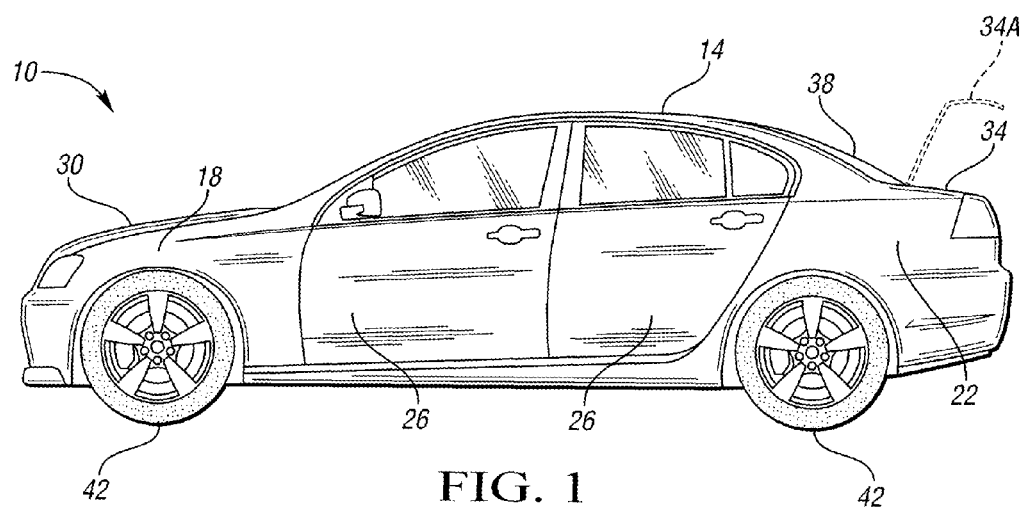
FIG. 1 is a schematic, side view of a vehicle including a rear window and a rear decklid.

Referring to FIG. 1, a vehicle 10 includes a vehicle body 14. The vehicle body 14 includes body panels, including front fenders 18 and quarter panels 22. The body 14 also includes closures that are movable between respective open and closed positions to selectively obstruct openings in the body. More specifically, the body 14 includes side doors 26, a hood 30, and a rear decklid 34. The body 14 also includes windows, including a rear window 38. The body 14 is rotatably supported about the ground by a plurality of wheels 42. The decklid 34 is selectively rotatable with respect to the rear window 38 between a closed position, as shown at 34, and an open position, as shown in phantom at 34A. In the closed position, the decklid 34 obstructs the opening to the rear cargo area, e.g., the trunk, and in the open position the opening to the rear cargo area is unobstructed by the decklid 34.

Figure 2:
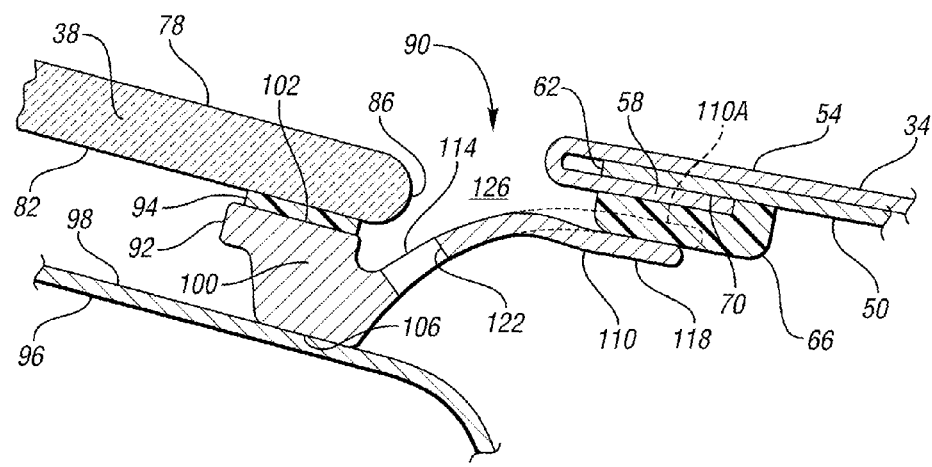
FIG. 2 is a schematic, cross-sectional side view of a close-out seal between the rear window and the rear decklid.

Referring to FIG. 2, wherein like reference numbers refer to like components from FIG. 1, the decklid 34 includes an inner panel 50 and an outer panel 54. The outer panel 54 includes a hem flange 58 that is bent around the forward edge 62 of the inner panel 50. The decklid 34 includes a hem sealant 66 that is applied to the hem flange 58 and the inner panel 50 to cover and seal the end of the flange 58.

The rear window 38 includes an outside surface 78 that defines a portion of the outer surface of the vehicle body 14. The rear window 38 also defines an inside surface 82 that is opposite surface 78 and that defines a portion of the vehicle passenger compartment. The window 38 is also characterized by a lower edge 86, which connects the outside surface 78 and the inside surface 82. The rear window 38 and the decklid 34 define a gap 90 therebetween. The body 14 includes a close-out seal 92 that bridges the gap 90.

The close-out seal 92 provides aesthetic benefits by obscuring the gap 90. The close-out seal 92 provides a "flush" appearance by not contacting or obstructing either the outside surface 78 of the window 38 or the outside (upper) surface of the decklid 34. More specifically, the close-out seal 92 is mounted to the inside surface 82 of the window 38 via adhesive foam tape 94 in the embodiment depicted. However, it should be noted that other methods of attaching the close-out seal 92 to the inside surface 82 of the window 38 may be employed within the scope of the claims; for example, the close-out seal 92 may be bonded to surface 82 with an adhesive. The close-out seal 92 contacts the decklid 34 when the decklid 34 is in the closed position, as shown in FIG. 2.

The vehicle body 14 includes structure 96 defining a support surface 98 forward of the decklid 34 and below the window 38. The close-out seal 92 includes a base 100 having an upper surface 102 and a lower surface 106. The upper surface 102 opposes surface 82 of the window 38 and is attached thereto by the tape 94. The lower surface 106 contacts the support surface 98 of the body structure 96.

The close-out seal 92 also includes a flap 110 that extends from the base 100 to the rear decklid 34 when the rear decklid 34 is in the closed position, as shown in FIG. 2. The flap 110 includes a root portion 114 and a constant-thickness portion 118. The root portion 114 connects the constant-thickness portion 118 to the base 100. The root portion 114 is tapered such that it increases in thickness with proximity to the base 100. That is, the root portion 114 is thickest adjacent the base 100, and decreases in thickness to the constant-thickness portion 118.

In the embodiment depicted, the constant-thickness portion 118 of the flap 110 contacts the sealant 66, but not the inner panel 50 or the outer panel 54, when the rear decklid 34 is in the closed position, thereby eliminating any possibility of wear to the painted metal surfaces of the inner panel 50 and the outer panel 54. As seen in FIG. 2, the seal 92 bridges the gap 90 between the window 38 and the decklid 34, but the seal 92 does not obstruct or contact the outside surface 78 of the window 38, thereby achieving a "flush" appearance and aesthetic.

In order to prevent inconsistent appearance of the close-out seal 92 along the cross-car width of the vehicle body 14, the decklid 34 elastically deforms the flap portion 110 when the decklid 34 is in the closed position as shown in FIG. 2; the flap 110 in its unstressed position is shown in phantom at 110A. This elastic deformation of the flap portion 110 results in the seal 92 exerting a spring force on the decklid 34. More specifically, in the embodiment depicted, the flap 110 portion of the close-out seal 92 exerts a force to the decklid 34 of between 1.0 and 1.4 Newtons per meter of length (e.g., transversely relative to the vehicle body 14) at the interface between the flap 110 and the decklid 34, and, more specifically, a force of 1.2 Newtons per meter of length. This range of forces was experimentally determined to provide satisfactory wind noise and water deflection performance with minimal effects to the surface of the decklid 34.

The geometry of the flap 110 facilitates the maintenance of a satisfactorily large force exerted on the decklid 34 while also preventing the transference of large forces (which may result from build variations) from the decklid 34 to the base 100. More specifically, the constant-thickness portion 118 of the flap 110 in the embodiment depicted has a length-to-thickness ratio of between 8:1 and 12:1, and, more particularly, has a length-to-thickness ration of 10:1. In the embodiment depicted, the constant thickness portion is 10 millimeters long and is 1 millimeter thick. The root portion 114 is 1.5 millimeters thick where it intersects the base 100. This geometry enables the flap 110 to be characterized by the absence of any notches that permit the flap to bend without transferring force to the base 100, but that may also act as stress concentrators.

The base 100 is significantly thicker than the flap 110, and therefore the base 100 has a much higher spring constant than the flap 110. The base 100 is therefore positioned such that the base 100 does not extend rearward past the lower edge 86 of the window 38 to aid in the assembly of the vehicle 10. More specifically, the vehicle 10 may be assembled by attaching the seal 92 to the window 38 prior to installation of the window 38 to the body 14. Immediately after installation of the window 38, the flap 110 would rest on the outer surface of the decklid 34. By subsequently moving the decklid 34 to its open position (shown at 34A in FIG. 1), the flap 110 would be unstressed and moved to the position shown at 110A. Subsequently closing the decklid 34 would then move the flap to the position shown at 110. If the base 100 protruded from the edge 86, it would interfere with such assembly because it would not deform sufficiently to accommodate the decklid 34.

The seal 92 does not obstruct or contact the lower edge 86 of the window 38, which eliminates the possibility of water or debris becoming entrapped between the seal 92 and the window 38. In the embodiment depicted, drain holes 122 are punched though the close-out seal 92 at the root portion 114 of the flap 110. The drain holes 122 are positioned such that they will drain any fluid out of the trough 126 formed between the rear window 38, the decklid 34, the base 100, and the flap 110. Optionally, the drain holes 122 may be omitted if, for example, the shape of the seal 92 is such that contaminants freely drain to the ends.

The interface patch of the flap 110 is low friction material (such as Alcryn), co-extruded or skim coated as appropriate. The surface of the flap is not flocked. The seal 92 may be extruded if there is minimal curvature across the vehicle 10, or injection molded if significant curvature or variation in curvature rate exists. In the embodiment depicted, the seal 92 is comprised of ethylene propylene diene monomer (EPDM) rubber. Alternatively, the seal 92 may be comprised of polyvinyl chloride (PVC), with a hardness of 40-50 Shore A.

FIG. 2 is a cross-sectional side view taken about a vertical plane that is parallel to the center line of the vehicle 10; the cross-sectional size and shape of the seal 92 is substantially constant along the length of the seal 92 (i.e., in the cross-car, transverse direction), and therefore FIG. 2 is representative of the seal 92 at all points along its cross-car length (though a drain hole 122 may or may not be present depending on where the section is taken).

While the best modes for carrying out the disclosure have been described in detail, those familiar with the art to which this disclosure relates will recognize various alternative designs and embodiments for practicing the disclosure within the scope of the appended claims.

The invention claimed is:

1. A vehicle comprising:
   a rear window having an outside surface, an inside surface, and a lower edge that connects the outside surface and the inside surface;
   a rear decklid including an inner panel and an outer panel, with the rear decklid movable with respect to the rear window between an open position and a closed position;
   the rear decklid and the rear window defining a gap therebetween;
   a close-out seal operatively connected to the inside surface of the rear window and contacting the rear decklid when the decklid is in the closed position;
   wherein the lower edge and outside surface of the rear window are unobstructed and uncontacted by the close-out seal;
   wherein the close-out seal includes a base and a flap that extends from the base to the rear decklid when the rear decklid is in the closed position;
   wherein the outer panel includes a hem flange;
   wherein a sealant contacts the hem flange and the inner panel; and
   wherein the flap contacts the sealant when the rear decklid is in the closed position.

2. The vehicle of claim 1, further comprising body structure defining a support surface forward of the rear decklid;
   wherein the close-out seal contacts the support surface.

3. The vehicle of claim 2, wherein the base is between the support surface and the rear window.

4. The vehicle of claim 3, wherein the flap includes a root portion and a constant-thickness portion;
   wherein the root portion connects the constant-thickness portion to the base;
   wherein the root portion increases in thickness with proximity to the base.

5. The vehicle of claim 4, wherein the constant-thickness portion and the root portion are characterized by the absence of notches.

6. The vehicle of claim 5, wherein the root portion defines at least one drain hole.

7. The vehicle of claim 4, wherein the flap of the close-out seal exerts a force to the decklid of between 1.0 and 1.4 Newtons per meter of cross-car length.

8. The vehicle of claim 7, wherein the constant-thickness portion of the flap has a length-to-thickness ratio of between 8:1 and 12:1.

9. The vehicle of claim 4, wherein the base does not extend rearward past the lower edge of the rear window.

10. An apparatus for a vehicle including a rear window and a rear decklid, the window having an outside surface, an inside surface, and a lower edge that connects the outside surface and the inside surface, the apparatus comprising:
    a close-out seal having a base and a flap extending from the base;
    the seal being sized and shaped such that, if the base is operatively connected to the inside surface of the rear window, the flap extends to and contacts the rear decklid without the seal contacting the outside surface and the lower edge;
    wherein the flap includes a root portion and a constant-thickness portion;
    wherein the root portion connects the constant-thickness portion to the base; and
    wherein the root portion increases in thickness with proximity to the base.

11. The apparatus of claim 10, wherein the rear decklid includes an inner panel and an outer panel;

wherein the outer panel includes a hem flange;
wherein a sealant contacts the hem flange and the inner panel; and
wherein the flap is configured to contact the sealant when the base is connected to the inside surface of the window and the base does not extend past the lower edge of the window.

12. The apparatus of claim 10, wherein the constant-thickness portion and the root portion are characterized by the absence of notches.

13. The vehicle of claim 12, wherein the root portion defines at least one drain hole.

14. The apparatus of claim 10, wherein the constant-thickness portion and the root portion are characterized by the absence of notches.

15. The apparatus of claim 10, wherein the root portion defines at least one drain hole.

16. The apparatus of claim 10, wherein the constant-thickness portion of the flap has a length-to-thickness ratio of between 8:1 and 12:1.

17. A vehicle comprising:
a rear window having an outside surface, an inside surface, and a lower edge that connects the outside surface and the inside surface;
a rear decklid movable with respect to the rear window between an open position and a closed position;
the rear decklid and the rear window defining a gap therebetween;
body structure defining a support surface forward of the rear decklid;
a close-out seal having a base operatively connected to the inside surface of the rear window and contacting the support surface, and a flap that extends from the base to contact the rear decklid when the decklid is in the closed position;
wherein the lower edge and outside surface of the rear window are unobstructed and uncontacted by the close-out seal; and
wherein the flap is characterized by the absence of notches.

18. The vehicle of claim 17, wherein the base does not extend rearward past the lower edge of the rear window.

19. The vehicle of claim 17, wherein the flap includes a root portion and a constant-thickness portion.

20. The vehicle of claim 19, wherein the root portion defines at least one drain hole.

* * * * *